(12) United States Patent
Sturman

(10) Patent No.: US 8,412,441 B1
(45) Date of Patent: Apr. 2, 2013

(54) MIXED CYCLE COMPRESSION IGNITION ENGINES AND METHODS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 179 days.

(21) Appl. No.: 12/878,852

(22) Filed: Sep. 9, 2010

Related U.S. Application Data

(60) Provisional application No. 61/240,995, filed on Sep. 9, 2009, provisional application No. 61/240,997, filed on Sep. 9, 2009.

(51) Int. Cl.
*B60T 7/12* (2006.01)
(52) U.S. Cl. ........................ 701/105; 701/115
(58) Field of Classification Search .......... 701/103–105, 701/114, 115
See application file for complete search history.

(56) References Cited

U.S. PATENT DOCUMENTS

| | | | |
|---|---|---|---|
| 6,415,749 B1 | 7/2002 | Sturman et al. | |
| 6,598,584 B2 * | 7/2003 | Beck et al. | 123/299 |
| 6,739,293 B2 | 5/2004 | Turner et al. | |
| 7,036,482 B2 * | 5/2006 | Beck et al. | 123/229 |
| 7,472,696 B2 * | 1/2009 | Easley et al. | 123/568.21 |
| 7,793,638 B2 | 9/2010 | Sturman | |
| 7,954,472 B1 | 6/2011 | Sturman | |
| 7,958,864 B2 | 6/2011 | Sturman | |
| 2002/0157623 A1 | 10/2002 | Turner et al. | |
| 2003/0015155 A1 | 1/2003 | Turner et al. | |
| 2007/0245982 A1 | 10/2007 | Sturman | |
| 2008/0264393 A1 | 10/2008 | Sturman | |
| 2009/0183699 A1 | 7/2009 | Sturman | |
| 2010/0006065 A1 * | 1/2010 | Tripathi et al. | 123/350 |

OTHER PUBLICATIONS

Alson, Jeff, et al., "Progress Report on Clean and Efficient Automotive Technologies Under Development at the EPA", *United States Environmental Protection Agency, EPA420-R-04-002*, (Jan. 2004), 198 pp total.

Brueckner, Stephen, "Reducing Greenhouse Gas Emissions From Light-Duty Motor Vehicles", *California Air Resources Board (ARB) Workshop*, (Apr. 20, 2004), pp. 1-37.

Daw, C. S., et al., "Stretch Efficiency for Combustion Engines: Exploiting New Combustion Regimes", *2009 DOE OVT Peer Review*, Project ID: ace_15_daw, (May 20, 2009), pp. 1-27.

Kang, Hyungsuk, et al., "Demonstration of Air-Power-Assist (APA) Engine Technology for Clean Combustion and Direct Energy Recovery in Heavy Duty Application", *SAE Technical Paper Series 2008-01-1197*, (Apr. 14-17, 2008), 9 pp total.

Longman, Douglas E., et al., "Late-Cycle Air Injection for Reducing Diesel Particulate Emissions", *Combustion and Emission Control for Advanced CIDI Engines, FY 2001 Progress Report*, (2001), pp. 152-155.

(Continued)

*Primary Examiner* — John Kwon
(74) *Attorney, Agent, or Firm* — Blakely Sokoloff Taylor & Zafman LLP

(57) ABSTRACT

Mixed cycle compression ignition engines and methods of operating a camless compression ignition engine by establishing a number of operating cycles for operating the engine, each for a particular engine load range and storing a respective algorithm and engine operating parameters for each operating cycle in a lookup table, receiving engine operating information, including piston position when compression ignition occurs, receiving a power setting for the engine, selecting from the lookup table, an algorithm and operating parameters for an operating cycle for the engine applicable to that power setting, operating the engine using the selected algorithm and operating parameters, and adjusting the engine operating parameters based on received engine operating information. Various operating cycles are disclosed.

21 Claims, 4 Drawing Sheets

OTHER PUBLICATIONS

Nehmer, Daniel A., et al., "Development of a Fully Flexible Hydraulic Valve Actuation Engine, Part I: Hydraulic Valve Actuation System Development", *Proceedings of the 2002 Global Powertrain Congress (GPC) on Advanced Engine Design and Performance*, (2002), 12 pp total.

Ricardo, Inc., "A Study of Potential Effectiveness of Carbon Dioxide Reducing Vehicle Technologies, Revised Final Report", *United States Environmental Protection Agency EPA420-R-08-004A*, EPA Contract No. Ep-C-06-003, Work Assignment No. 1-14, (Jun. 2008), 126 pp total.

Vance, Evelyn, et al., "Advanced Fuel Injection System and Valve Train Technologies", SBIR Phase II Project Final Report, SBIR Contract No. W56HZV-07-C-0528, (Oct. 19, 2009), pp. 1-237.

Yamaguchi, T., et al., "Improvements for Volumetric Efficiency and Emissions using Digital Hydraulic VVA in a High Boosting Diesel Engine", *THIESEL 2008 Conference on Thermo- and Fluid Dynamic Processes in Diesel Engines*, (2008), pp. 1-13.

\* cited by examiner

MIXED CYCLE COMPRESSION IGNITION ENGINES AND METHODS

CROSS-REFERENCE TO RELATED APPLICATIONS

This application claims the benefit of U.S. Provisional Patent Application No. 61/240,995 and U.S. Provisional Patent Application No. 61/240,997, both filed Sep. 9, 2009.

BACKGROUND OF THE INVENTION

1. Field of the Invention

The present invention relates to the field of combustion ignition engines.

2. Prior Art

Compression ignition engines such as diesel engines are well known in the prior art. Such engines have a rather high compression ratio, and operate on the principle that the heat of compression will be high enough to cause ignition of diesel fuel when injected into the combustion chamber at or near the end of the compression stroke. Also known are compression ignition engine operating cycles that inject fuel into the combustion cylinder during the compression stroke well advanced of ignition to allow the fuel to mix well with the air in the cylinder, and to evaporate into a gaseous form before ignition. This is generally referred to as homogenous charge, compression ignition, or HCCI. HCCI works well in assuring complete combustion (lack of generation of soot or black engine exhaust). It also provides a more uniform temperature rise, avoiding local hot spots that result in the formation of $NO_X$. However, it also has certain inherent limitations. Because of the uniform charge, ignition begins in multiple locations, almost simultaneously everywhere, at or near top dead center, before expansion during the power stroke has an opportunity to really begin. Consequently the temperature rise, while uniform, must be limited by limiting the amount of fuel injected during the compression stroke, limiting the power attainable to perhaps 20% to 30% of that which the engine is otherwise capable of.

Also known are camless engines, that is, engines using some form of engine valve operation other than a camshaft. One type of camless engine uses hydraulic engine valve control using electronically controlled valves for the engine valve control. See for example U.S. Pat. No. 6,739,293, the disclosure of which is incorporated herein by reference. Such valve control provides great flexibility in engine operation, whether in optimizing conventional engine operating cycles or executing advanced operating modes, such as in U.S. Patent Application Publication No. US 2007/0245982 A1, the disclosure of which is also incorporated herein by reference. In general, engines for operating using high pressure air injection have certain cylinders permanently dedicated to air compression and other cylinders permanently dedicated to combustion (power) cylinders.

DETAILED DESCRIPTION OF THE PREFERRED EMBODIMENTS

Figure 1:
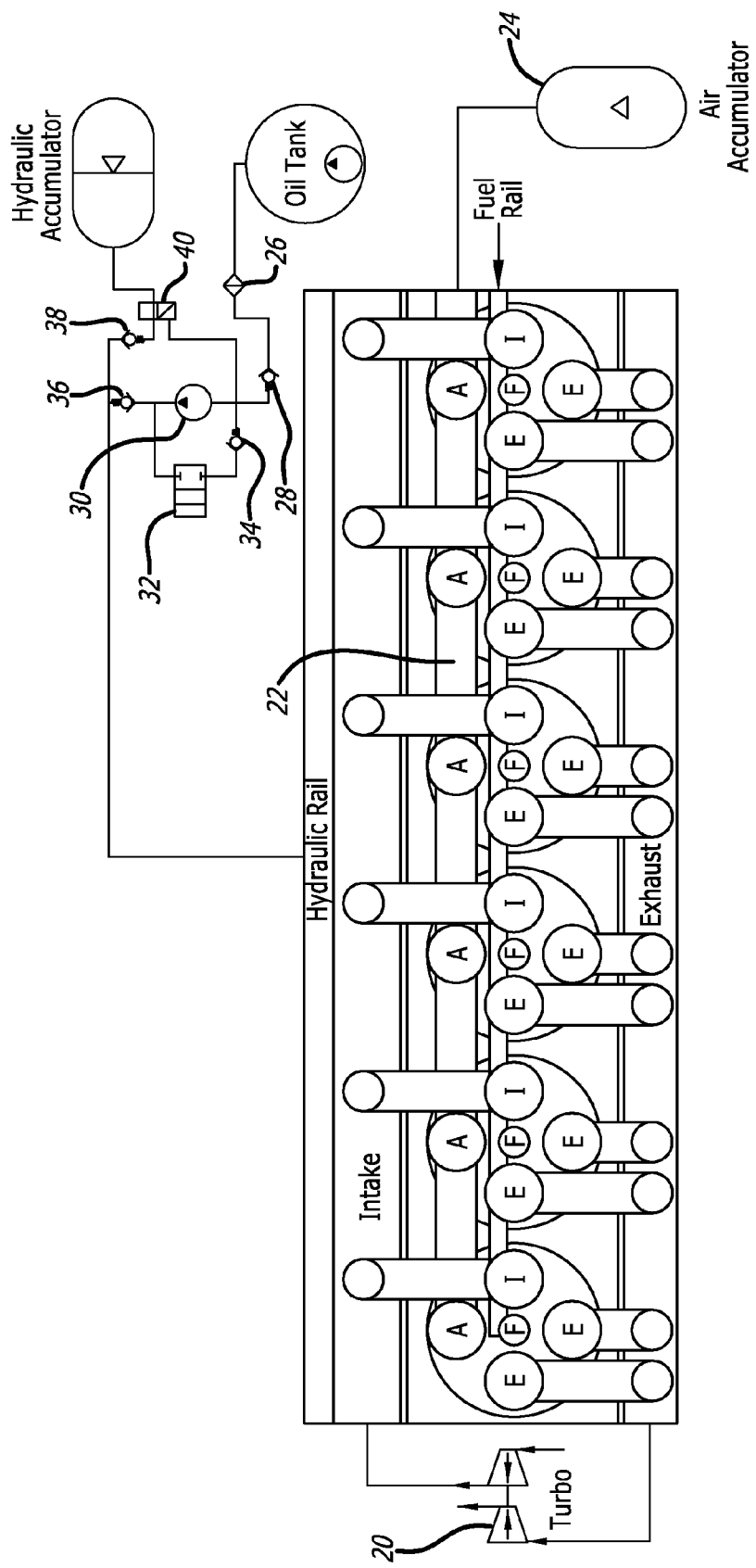
FIG. 1 is a schematic illustration of a six cylinder compression ignition engine showing an exemplary engine valve and fuel injector arrangement in each cylinder.

First referring to FIG. 1, a schematic representation of a six cylinder engine in accordance with a preferred embodiment of the present invention may be seen. The engine shown utilizes a modified head of the type having two intake valves and two exhaust valves, as is common on many current engines. In that regard, the head may be a modified head as opposed to a new head, as the present invention may be incorporated in an engine as a retrofit with appropriate engine modifications, primarily with respect to the engine head.

The engine includes an Intake manifold and an Exhaust manifold, as in a conventional engine, and preferably includes an exhaust driven Turbo charger 20 to boost the air pressure in the Intake manifold. The two exhaust valves E for each cylinder are coupled to the Exhaust manifold and one of the intake valves I for each cylinder is coupled to the Intake manifold, all in the conventional manner. A second valve, previously used as a second intake valve, is used in the embodiment shown as an air valve A coupled to an air rail 22. The air rail is also coupled to an Air Accumulator 24, capable of storing air at high pressures. Each engine cylinder also includes a fuel injector F connected to a fuel rail. Not shown in this Figure is the valve actuation system for the exhaust valves E, the intake valves I and the air valves A, which in an exemplary embodiment are hydraulically actuated, generally in accordance with U.S. Pat. No. 6,739,293, though preferably with a boost-drive system for engine valve opening whereby initial opening of the engine valve is by way of a relatively large hydraulic area, with a smaller hydraulic area than being used to move the engine valve to its full lift. Such an engine valve driven system may comprise, by way of example, two concentric pistons, with one of the pistons, typically the outer piston, having a much more limited stroke than the inner piston to initially open the engine valve, after which the smaller piston then moves the engine valve to its full lift.

It will be noted in FIG. 1 that the only change to the engine head is the blocking off of the normal porting of what was an intake valve and coupling the same to an air rail 22, which may be a bolt-on air rail. Also, the valve actuation system, in the preferred embodiment a hydraulic valve actuation system, may also be a bolt on assembly to convert the engine to an electronically controlled camless type engine, allowing complete flexibility in the engine valve timing. It will also be noted in FIG. 1 that all cylinders are identical in their valving arrangements as well as having a fuel injector, so that at any one time, any cylinder may be used to compress the intake air and deliver the same to the air rail 22, during which time the electronically controlled fuel injector is not actuated, or the cylinder may be used as a combustion cylinder, with or without injection of air from the high pressure air rail 22. In that regard, because each cylinder has an intake valve, at least one exhaust valve and a fuel injector, the engine may be operated as a conventional four stroke compression ignition engine, though would not breathe well at high engine speeds. However, such operation could be useful for some purposes, such as for initial starting of the engine.

Figure 2:
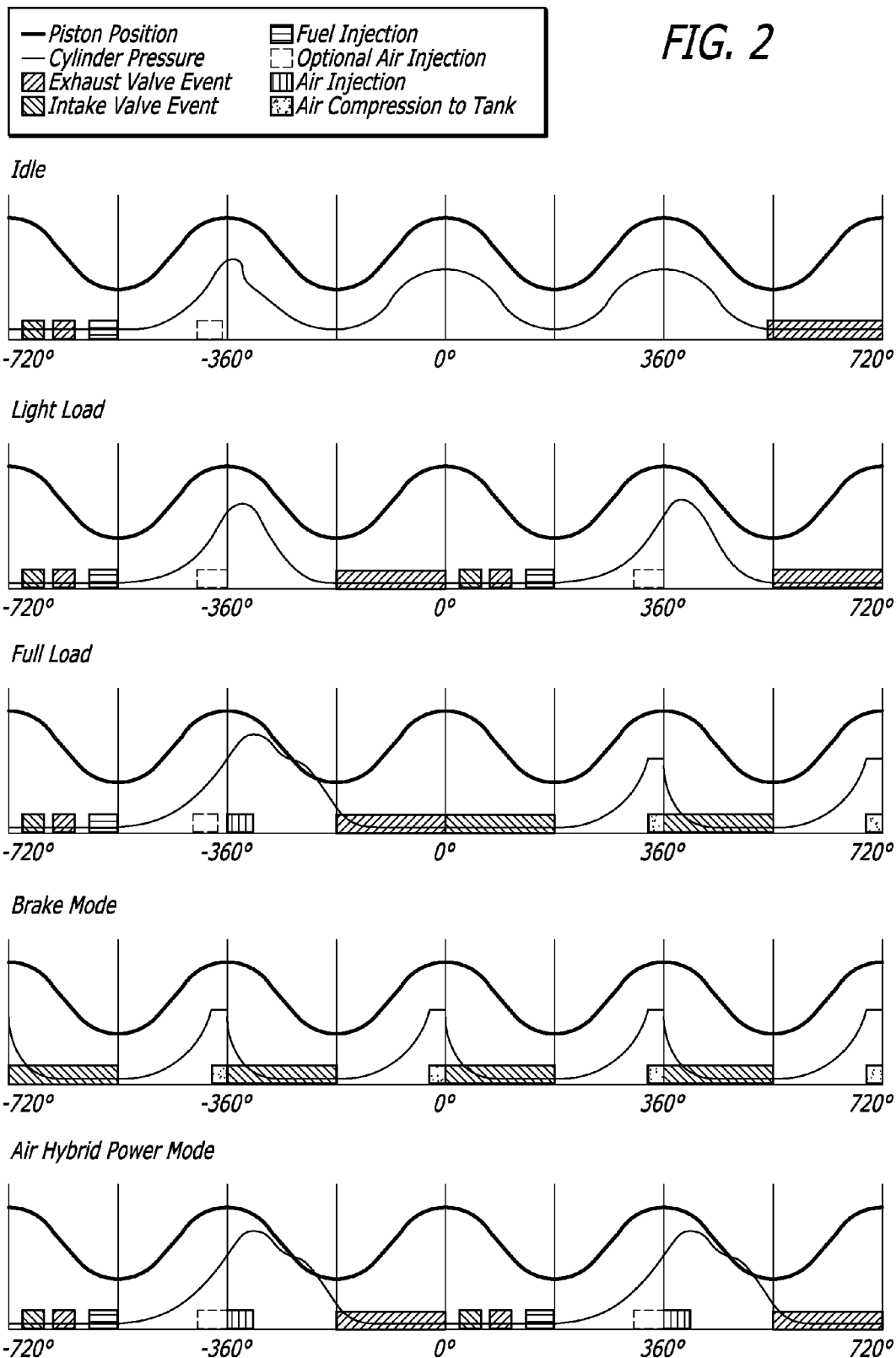
FIG. 2 is a schematic illustration of multiple operating cycles for the engine of FIG. 1.

One of the features of the present invention is the ability of the engine to operate using different cycles, which allows the selection of the operating cycle that best suits the particular power setting of the engine. In particular, FIG. 2 presents graphs schematically illustrating five exemplary operating modes or cycles, specifically, idle, light load (low power), full load (maximum power), brake mode and air hybrid power mode. Each operating mode described herein will be somewhat variable to provide power over some operating range. The piston position for the particular cylinder under consideration is shown by the bold top curve in each graph, with the cylinder pressure being schematically illustrated by the second curve generally thereunder. Also the various valve events are illustrated as well as the fuel injection event, in accordance with the key at the top of the Figure. These events are displayed relatively schematically in both timing and duration, though well illustrate the principles of the invention.

Each of the curves in FIG. 2 begins with the piston at top dead center (the $-720°$ position on the graphs) following an exhaust stroke. Considering first the idle condition illustrated by the first curve, the intake valve opens as the piston moves downward to bring in air from the Intake manifold and then closes, followed by an opening of the exhaust valve to bring back some of the hot exhaust gasses exhausted during the exhaust stroke. After the exhaust valve closes, fuel injection occurs, with all the fuel to be injected for combustion being injected at this time (Fuel could be injected, or at least started in this and other modes while the exhaust valve is still open). While the graph for idle shows fuel injection to stop at the bottom dead center position of the piston, this is approximate only, and fuel injection may be terminated before or somewhat after this position, though preferably before substantial compression occurs during the following compression stroke.

The mixture of intake air and exhaust gas provides a hot environment with limited oxygen into which the fuel is injected, causing the fuel to change to a gaseous form, though without ignition as the temperature still is well below the ignition temperature. When the piston returns to top dead center again at $-360°$, compression ignition will occur. If desired, some high pressure air can be injected into the combustion chamber just before or around top dead center to provide additional air for complete combustion of the fuel and to control the time of compression ignition. Alternatively, or in addition, the time of compression ignition may be controlled by control of the intake and exhaust events during the intake stroke, with adjustments for each cycle being made based on the parameters of the prior cycle and its time of ignition so that the time of ignition can be accurately controlled.

From $-360°$ to $-180°$ is the expansion or power stroke. Under the idle condition, this is followed by two more compression and expansion strokes, during which all valves remain closed, after which the exhaust valves opens at approximately 540° for the exhaust stroke through 720°, at which time the cycle repeats. Thus at idle the engine, or at least some cylinders, may operate on this eight stroke cycle. The advantage of such a cycle is that more fuel may be injected in the single injection event than in a four two-stroke cycles or two four-stroke cycles, making the beginning and end of injection a smaller part of the total injection, thus providing easier and better control of the injected amount. Still, the total amount of fuel injected is purposely kept below that which will cause temperatures in the combustion chamber to reach temperatures at which $NO_x$ is formed. Accordingly because of the excellent mixing of the fuel and air before compression ignition and the limit on combustion temperatures, no $NO_x$ is formed. Also because of the extra compression strokes between $-180°$ and $0°$, and $360°$ and $540°$, these essentially form reburn strokes which more than ensure complete combustion of the injected fuel.

In the eight stroke cycle just described, exhaust gas was exhausted and then after a partial intake stroke, exhaust gas was reintroduced in another part of the intake stroke. As an alternative, the exhaust valve might be closed before the piston reaches top dead center in the preceding exhaust stroke to trap some exhaust gas in the cylinder, with some air intake occurring in the intake stroke to obtain the same air-exhaust gas mixture. This is not preferred, however, as it has been found easier (more controllable) to have a complete exhaust stroke, then draw in intake air, then some exhaust gas, as initially described.

Operation under a light load condition is similar to the operation at idle, though includes two combustion or power strokes in the eight strokes (essentially operating in a four stroke cycle) rather than the single power stroke in the eight stroke cycle of the idle condition. In particular, the four dead strokes between $-180°$ and 540° in the idle cycle are replaced by an additional exhaust, intake, fuel injection, compression and power strokes.

Under the full load condition, following an exhaust stroke the subsequent intake stroke starting at $-720°$ is the same or similar to that of idle and light load, though the maximum amount of fuel will be injected rather than smaller amounts under idle and light load conditions. While that fuel is again injected into a hot mixture of exhaust gasses and intake air, the amount of intake air is purposely limited so that the fuel-air mixture is well below the stoichiometric ratio, i.e., is quite fuel rich. Then at the end of the compression stroke at $-360°$, compression ignition will occur, though as before, combustion temperatures will be limited to below the temperatures at which $NO_x$ is formed to again avoid forming $NO_x$ in the combustion process, but this time not by the limited amount of fuel present, but rather by the limited amount of air (oxygen) present. Then after ignition occurs and as the pressure and temperature in the combustion chamber begin to decrease, high pressure air is injected to sustain combustion and consume all of the fuel that was initially injected. While the air injection is shown as starting at the top dead center position of $-360°$, the air injection may start somewhat later to sustain combustion, but at a rate which limits the combustion temperatures to below those at which $NO_x$ is formed. This controlled injection of air not only has the advantage of avoiding $NO_x$ formation, but also sustains combustion through a larger crankshaft angle, providing more efficient conversion of the combustion chamber pressure to mechanical energy. If desired, some air may be injected just before top dead center, though care must be taken to not have excessive amounts of air in the combustion chamber at the time of ignition or the temperature for $NO_x$ formation may be exceeded.

After the combustion or power stroke under the full load condition, the exhaust valves are opened at $-180°$, the bottom dead center position, and an exhaust stroke is executed, followed by the closing of the exhaust valves at the 0° position and the opening of the intake valve for an intake stroke, ending at the 180° position. Thereafter a compression stroke occurs, with the air valve A (FIG. 1) being opened near the end of the compression stroke and closed at the end of the compression stroke at 360° to deliver high pressure air to the air accumulator 24 (see FIG. 1 again). After the air valve A closes at 360°, the intake valve opens and another intake stroke is executed, with the intake valve closing at 540°, followed by another compression and delivery of air to the air accumulator 24 at 720°. Thereafter the entire cycle repeats. Thus, under full load, each cylinder is operated in an eight stroke cycle with a single combustion or power stroke. However, note that high pressure air is delivered to the air rail 22 and the air accumulator 24 during two of those strokes, while being injected in only one combustion or power stroke. This, together with some intake air going into the cylinder during the stroke from −720° to −540°, actually provides more than double the total amount of air in the combustion stroke than would occur in a conventional four stroke cycle, allowing combustion and cylinder pressures to be sustained through a relatively large crank angle for highly efficient conversion to mechanical energy.

The fourth mode illustrated in FIG. 2 is referred to as the brake mode, wherein the engine is used as a brake. Here the first stroke starting at −720° is an intake stroke, followed by a compression stroke, with delivery of the high pressure air to the air accumulator 24 near the end thereof at −360°. This is immediately followed by another intake stroke, followed by another compression stroke and delivery of air to the air accumulator, etc., so that each pair of strokes are intake, and compression and delivery of high pressure air to the air accumulator. Thus substantial engine braking results, though with a substantial amount of the energy expended in air compression being stored in the air accumulator for later use. Of course ultimately when the air accumulator reaches its pressure limit, the exhaust valves E may be opened near top dead center instead of the air valve A, which will produce similar engine braking results but without any further storage of energy. Alternatively, a pressure relief valve on the air accumulator may bleed off the high pressure air. This alternative may have some advantages, in that the pressure relief valve would always operate at the same pressure, so that the noise generated would have substantially fixed frequencies, making noise suppression easier. This is to be compared to the opening the exhaust valves at top dead center, which generates exhaust noise at engine speed dependent frequencies, complicating noise suppression, and actually being banned in some areas because of the noise.

Finally, the fifth mode is referred to as an air hybrid mode. Here the operation is similar to that of the light load, in that there are two combustion or power strokes in each eight stroke cycle, but with much more (typically the maximum amount) fuel being injected during the corresponding intake stroke and with substantial amounts of air being injected after the −360° position and the 360° position to sustain combustion through a substantial crankshaft angle and consume all the fuel, as in the full load operation. In that regard, the power for each combustion or power stroke that is realized is substantially the same as in the full load condition, though twice as many power strokes are obtained in the air hybrid power mode eight stroke cycle than are obtained in the full load eight stroke cycle. In essence, the engine is operating using the high pressure air stored in the air accumulator 24 to provide an exceptional burst of power as may be useful in a vehicle for such purposes, by way of example, to avoid unfortunate traffic situations or to provide a boost of power when stuck in sand or soft earth. Obviously the storage capacity of the air accumulator will be limited so the length of time such operation can be sustained will similarly be limited, though the burst of power available through the air accumulator in this manner can be highly beneficial under certain conditions.

It should be noted that not all cylinders of a multi-cylinder engine must operate on the same cycle at the same time. Also of course other modes of operation are possible.

In that regard, it has already been pointed out that the engine may be operated in a standard four stroke mode, or could even be operated in a two stroke mode. Another mode of operation is to operate the engine as in the full load mode, but with much less fuel injection and much less (if any) air injection after ignition. This mode essentially operates the engine as an air compressor, or partially as an air compressor, to recharge the air accumulator. In this mode, the compressed air could be used for other purposes, or stored in preparation for a need for the power boost of the air hybrid power mode. Obviously for air injection as described herein, the air pressure in the air accumulator 24 must exceed the pressure in the combustion chamber at the time of injection, so the air accumulator must be capable of storing air at significantly higher pressures to provide meaningful air storage for the air hybrid mode. In that regard the theoretical compression ratio of the engine may be increased above a normal compression ratio, as the real compression ratio for compression ignition to occur at or near top dead center is controllable through control of the engine valves, so the actual physical compression ratio for air compression can be higher than the actual compression ratio used for compression ignition.

In all modes of operation in which combustion occurs, the amount of fuel or the amount of air present is limited to keep combustion temperatures below the temperatures at which $NO_x$ is formed, though high enough to assure complete combustion of the fuel to avoid soot formation. Also in those modes, the system is controlled to obtain ignition at or near top dead center, with trimming adjustments to the system being made in one cycle based on what happened in the previous cycle. Thus to control the timing of compression ignition, one needs to know when compression ignition occurred in the past. This can be done various ways, such as by providing pressure sensors coupled to each combustion chamber. Also crankshaft sensing can provide the required information, as crankshaft acceleration and deceleration within the crankshaft rotation has proven to be a sensitive indicator. By way of example, early ignition will cause a deceleration of the crankshaft as it approaches top dead center, while late ignition will show a temporary absence of expected substantial rise in acceleration of the crankshaft as it passes top dead center.

With respect to FIG. 2, the Figure is schematic, in that the timing and time duration of valve operation and fuel injection are approximate only, and may vary without departing from the spirit and scope of the invention. By way of specific example, the fuel injections for idle, light load and full load are shown schematically as being of the same duration, though obviously for full load, much more fuel must be injected than for idle or light load operation, which in turn normally means that the duration of fuel injection at full load will be considerably longer than for idle or light load operation. In that regard, while the engine may be operated on diesel fuel, the engine may also be operated on other liquid fuels, such as bio-diesel or gasoline, or mixtures thereof, or even be adapted to operate on gaseous fuels by use of alternate fuel injection, though the present invention is ideal for liquid fuels, as unlike conventional compression ignition engines, the present invention assures conversion of the liquid fuel to a gas and good mixing with the available air before combustion.

Figure 3:
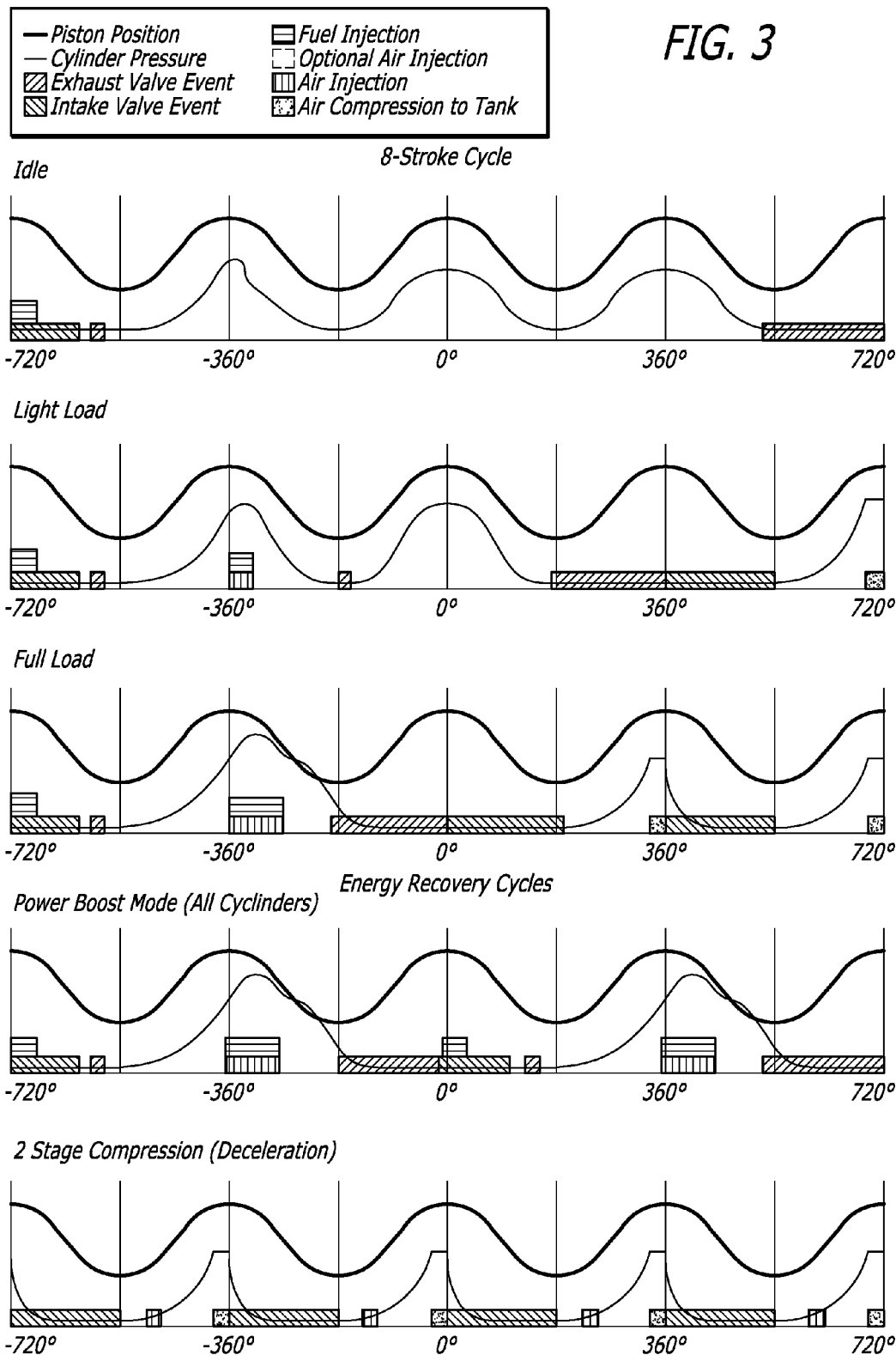
FIG. 3 is a schematic illustration of a variation of the multiple operating cycles for the engine of FIG. 1.

In FIG. 3, some exemplary variations on the cycles of FIG. 2 are illustrated. By way of example, in FIG. 3, it will be noted that in each instance, fuel injection occurs either during an intake event or during an air injection event. This has the advantage of providing increased mixing of the fuel and air for better and more even combustion. While the exhaust valve is opened thereafter for a short time, that opening is part of the intake sequence so that no injected fuel is exhausted. Also, under light load conditions in FIG. 3, some fuel and air is injected after ignition at the −360° point, with some exhaust at the −180° position followed by a reburn compression and expansion, which in turn is followed by a full exhaust and full intake for compression of air for delivery to the air accumulator. For a full load the cycle is similar to that shown in FIG. 2, with the exception of fuel as well as air being injected after the −360° position.

In the power boost mode, air for injection is provided by the air accumulator so that the engine is operated in a full four stroke mode, with fuel being injected during part of each intake stroke and some exhaust gas ingested with fuel and air from the air accumulator being injected after ignition to sustain ignition through a wider crankshaft angle. This power boost mode provides a burst of power when needed, though the amount of high pressure air that can be provided by the air accumulator is necessarily limited so that operation under the power boost mode cannot be sustained for a substantial length of time. Finally, the two stage compression (deceleration) operation is for braking, much like a Jake brake. However, unlike the brake mode of FIG. 2, high pressure air is also injected at the beginning of the compression stroke so that the average cylinder pressure during compression will be higher than in the brake mode of FIG. 2. Thus substantially increased engine braking can be achieved.

It should be noted that the various operating modes may be mixed or varied, as desired. By way of example, an eight stroke idle cycle might be immediately followed by an eight stroke light load cycle, followed by a further eight stroke idle cycle, etc. Similarly, one or more light load eight stroke cycles might be followed by one or more eight stroke full load cycles, followed by additional eight stroke light load cycles, etc. Also in FIG. 2, the light load mode may have the intake and fuel injection overlap as in the idle mode of FIG. 3. Without the optional air injection just before or after ignition, this cycle is generally referred to as HCCI, or homogenous charge, compression ignition. It is a very low emissions mode because of the excellent mixing and conversion of the fuel to gaseous form before ignition causes complete combustion and an absence of hot spots that would cause the formation of $NO_x$, but it is limited in the power that may be generated because of the limited fuel that can be injected during the intake stroke without exceeding $NO_x$ formation temperatures.

Referring again to FIG. 1, a hydraulic rail for physically powering the intensifier type fuel injectors and the hydraulic valve actuation system may be seen. Oil is supplied to the hydraulic rail from the oil tank through a filter 26 and a check valve 28, with pump 30 providing the required pressure of oil to supply the hydraulic rail. In one embodiment the oil is engine oil, though other fluids could be used, including diesel fuel if desired. A two-way valve 32 is used to couple the outlet of pump 30 to its inlet through check valve 34. Thus when further high pressure oil to the hydraulic rail is not immediately needed, valve 34 may be electrically opened to couple the outlet of pump 30 back to its inlet, whereby power consumed by the pump is substantially eliminated by its effectively pumping through a zero differential pressure. Backflow from the hydraulic rail through valve 32 is prevented by check valve 36. Also, a hydraulic accumulator is coupled through check valve 38 and three-way valve 40. When the valve is in one position, pump 30 may deliver excess oil through check valves 36 and 38 to the hydraulic accumulator. When valve 40 is in the opposite position, the oil stored under pressure in the hydraulic accumulator is coupled back to the inlet of pump 30 so that pump 30, typically a positive displacement pump, can pump oil from the hydraulic accumulator pressure to the pressure of the hydraulic rail, thereby recovering the energy stored in the hydraulic accumulator. Thus when a burst of power is needed, such as during the power boost mode of FIG. 3, the energy stored in the hydraulic accumulator may be delivered to the input of pump 30, thereby grossly reducing is mechanical input power requirement, the hydraulic accumulator being replenished during normal operation of the engine.

Figure 4:
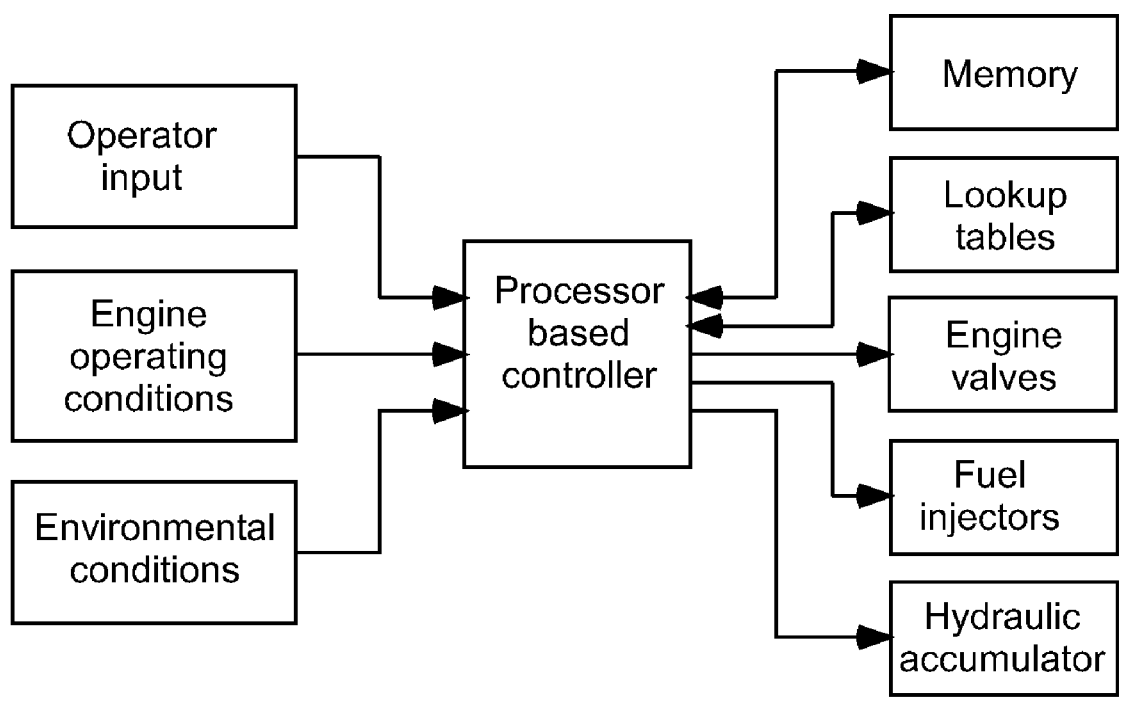
FIG. 4 is a block diagram of an exemplary engine control system.

A representative control system for the various modes of operation is shown in FIG. 4. The system is processor controlled, and receives as inputs, the engine operating conditions and environmental conditions, and or course, operator inputs. The engine operating conditions would include such things as engine temperature and speed, as well as additional inputs such as some indication of the crankshaft angle at which ignition occurred, such as crankshaft acceleration and/or combustion chamber pressure. Environmental conditions generally would include ambient pressure and temperature, which operator inputs would include a "throttle" input, such as accelerator position in mobile applications, perhaps a boost command, and perhaps even an identification of the fuel being used. Aside from ordinary memory, which would include both volatile and nonvolatile memory, lookup tables are provided to store the basic algorithms for the various operating modes, and perhaps each for operation of the invention with more than one fuel, such as diesel, bio-diesel, etc., and perhaps even ammonia. In general, the operation of the engine will be iterative, with the engine valves and fuel injectors following the respective algorithm, but with their operation and timing (algorithm parameters) being adjusted based on the results of the preceding cycle. If desired, the adjustments themselves may be saved, such as by updating the lookup tables, so that one can fill a fuel tank with bio-diesel which previously contained diesel, the engine will adapt to the changing fuel as the diesel is used up and the bio-diesel starts to reach the engine. This way, when the engine is operating cycle is changed, the parameters will be available for immediate use. Also, if the engine is shut off and restarted later, it will start expecting the bio-diesel fuel. Starting of the engine, as previously described, may be done by selecting one of the operating modes described herein, or alternatively by using a conventional four stroke diesel cycle, perhaps operating on the conventional four stroke cycle until the engine at least begins to warm up.

The present invention has been primarily described herein with respect to camless engines of the crankshaft type, though the various modes of operation may be readily used in free piston engines, i.e., engines having neither a camshaft nor a crankshaft, but generally including some indication of piston position other than, of course, crankshaft angle. In general, the operating mode is selected at any one time to provide the desired power while maximizing efficiency and minimizing the formation of pollutants.

Thus the present invention has a number of aspects, which aspects may be practiced alone or in various combinations or sub-combinations, as desired. While preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a camless compression ignition engine comprising:
    establishing a number of operating cycles for operating the engine, each for a particular engine load range, each operating cycle including a different combination of engine operating parameters, including engine valve and fuel injector operation and timing;
    storing a respective algorithm and engine operating parameters for each operating cycle in a lookup table;

receiving engine operating information, including piston position when compression ignition occurs;

receiving a power setting for the engine;

selecting from the lookup table, an algorithm and operating parameters for an operating cycle for the engine applicable to that power setting;

operating the engine using the selected algorithm and operating parameters; and adjusting the engine operating parameters based on received engine operating information.

2. The method of claim 1 wherein the operating parameters as adjusted are stored for subsequent use when the operating cycle of the engine is changed or the engine is shut off.

3. The method of claim 1 wherein the operating parameters as adjusted are stored for subsequent use when the operating cycle of the engine is changed or the engine is shut off, whereby the engine is self adapting to a change in fuels.

4. The method of claim 1 wherein one of the operating cycles is a homogenous charge, compression ignition operating cycle.

5. The method of claim 1 wherein at least one operating cycle includes the injection of fuel while the intake valve is open.

6. The method of claim 1 wherein at least one operating cycle includes the injection of fuel and air after ignition and during the power stroke.

7. The method of claim 1 wherein at least one operating cycle includes one air compression stroke for delivery of high pressure air to an air rail.

8. The method of claim 7 wherein the respective operating cycle includes the injection of high pressure air from the air rail after ignition.

9. The method of claim 8 wherein the respective operating cycle also includes the injection of fuel after ignition.

10. The method of claim 8 wherein the respective operating cycle includes the injection of fuel during the injection of air after ignition.

11. The method of claim 1 wherein at least one operating cycle includes two air compression strokes for delivery of high pressure air to an air rail.

12. The method of claim 11 wherein the respective operating cycle includes the injection of high pressure air from the air rail after ignition.

13. The method of claim 12 wherein the respective operating cycle also includes the injection of fuel after ignition.

14. The method of claim 12 wherein the respective operating cycle includes the injection of fuel during the injection of air after ignition.

15. The method of claim 1 wherein the respective operating cycle includes the injection of high pressure air from the air rail after ignition.

16. The method of claim 1 wherein one of the operating cycles is an engine braking cycle comprising successive intake and compression strokes wherein high pressure air is delivered to an air rail with no intervening strokes.

17. The method of claim 16 wherein high pressure air from the air rail is injected at or near the start of each compression stroke.

18. The method of claim 1 wherein each cylinder of the engine has at least one intake valve, at least on exhaust valve, at least one air injection valve and a fuel injector.

19. The method of claim 1 wherein the engine operating parameters include a number of strokes per operating cycle.

20. The method of claim 1 further comprising receiving engine temperature and speed.

21. The method of claim 1 wherein the operation and timing of the engine valves and fuel injectors being adjusted based on the results of the preceding cycle.

* * * * *